US008527580B2

(12) United States Patent
Allen

(10) Patent No.: US 8,527,580 B2
(45) Date of Patent: Sep. 3, 2013

(54) SAVING MULTIPLE DATA ITEMS USING PARTIAL-ORDER PLANNING

(75) Inventor: Joel Benjamin Allen, Mebane, NC (US)

(73) Assignee: International Business Machines Corporation, Armonk, NY (US)

(*) Notice: Subject to any disclaimer, the term of this patent is extended or adjusted under 35 U.S.C. 154(b) by 437 days.

(21) Appl. No.: 12/844,404

(22) Filed: Jul. 27, 2010

(65) Prior Publication Data

US 2012/0030273 A1    Feb. 2, 2012

(51) Int. Cl.
*G06F 15/16* (2006.01)

(52) U.S. Cl.
USPC ........................................................ 709/203

(58) Field of Classification Search
USPC .................................. 709/203, 201, 217, 246
See application file for complete search history.

(56) References Cited

U.S. PATENT DOCUMENTS

| 6,505,228 B1* | 1/2003 | Schoening et al. ........... 718/106 |
| 6,536,935 B2 | 3/2003 | Parunak et al. |
| 2004/0199575 A1 | 10/2004 | Geller |
| 2007/0055575 A1 | 3/2007 | McDonald et al. |

FOREIGN PATENT DOCUMENTS

WO    2009/152891 A2    12/2009

OTHER PUBLICATIONS

Gustafsson, Thomas, et al., "Data Freshness and Overload Handling in Embedded Systems", INSPEC/IEEE (2006).
Batini, Carlo, et al, "Methodologies for Data Quality Assessment and Improvement", ACM Digital Library, vol. 41, No. 3, article 16 (Jul. 2009).

* cited by examiner

*Primary Examiner* — Larry Donaghue
*Assistant Examiner* — Marshall McLeod
(74) *Attorney, Agent, or Firm* — Charles L. Moore; Moore & Van Allen PLLC

(57) ABSTRACT

A method for saving data may include determining dependencies, by a processing device, between a plurality of data items. The method may also include initiating a save operation by the processing device. Initiating the save operation may include forming a partial-order plan for saving the data items. Forming the partial-order plan may include creating an ordered list of steps which are executable for saving the data items based on the dependencies between the data items.

22 Claims, 2 Drawing Sheets

SAVING MULTIPLE DATA ITEMS USING PARTIAL-ORDER PLANNING

BACKGROUND

Aspects of the present invention relate to saving data and more particularly to a method, system and computer program product for saving multiple data items using partial-order planning.

In saving multiple data items, for example, by a server, there may be dependencies between the data items that require the data items to be stored in a particular order. For example, where the client wishes to create two items in one multipart request where the first item is a child of an existing resource on the server and the second item is a child of the first item, the client does not have a real ID for the first item since it has not be saved or created on the server. The second item needs a real ID of the first item in order to specify its parent. Under these circumstances the two items cannot be created in a single request because the real ID that the second item needs in order to be created is not yet available until the server responds from the request to create the first item with its real ID.

BRIEF SUMMARY

According to one aspect of the present invention, a client computer system or processing device may be provided with an awareness of conflicts and dependencies between data resource items during a save operation of the data resource items. If the client knows that there are dependencies between data items, the client can handle the serialization of save requests correctly. The client can send the requests for saving the data items in a particular order so that information that is necessary for pending requests can be retrieved first before sending those requests for saving other data items that may have a dependency on previously saved data items. Complex chains of dependencies between data items can be resolved by creating a partial-order plan of the data items to be saved. The partial-order plan may include steps or pre-steps that define whether or not a data item must wait for another data item to be saved first by the server in order to receive the server response with the needed information from saving the first data item, before the second data item can be saved as well. The server response may include real identification (ID) information of the first saved data item or other information that may be needed to be referenced by the second data item to be saved.

According to another aspect of the present invention, partial-order planning may be used to order steps even if the server does not support multipart requests and each resource or data item must be sent individually. In this case, a batch of requests for saving data items may be sent immediately. The client may then wait for all of the responses to the requests to acquire any information required for any dependencies between data items before proceeding to send the next request.

According to a further aspect of the present invention, if multipart requests are possible, the partial-order planning may include ordering data items or steps within the same multipart request. Subtle dependencies between data items may exist that do not explicitly require those items to get information about each other after the save processing occurs. However, the data items may still be required to be sent to the server in a particular order so that they may be modified correctly according to the particular semantics of the remote data model.

According to another aspect of the present invention, a method for saving data may include determining dependencies, by a processing device, between a plurality of data items for saving the data items. The method may additionally include initiating a save operation by the processing device. Initiating the save operation may include forming a partial-order plan for saving the data items. Forming the partial-order plan may include creating an ordered list of steps which are executable for saving the data items based on the dependencies between the data items.

According to another aspect of the present invention, a system for saving data may include a processing device. The system may also include a module operating on the processing device for saving data. The module may be adapted to determine dependencies between a plurality of data items and to initiate a save operation. A partial-order plan for saving the data items may be formed in response to the save operation. An ordered list of steps may be created as part of the partial-order plan. The ordered list of steps is executable for saving the data items based on the dependencies between the data items.

According to a further aspect of the present invention, a computer program product for saving data may include a computer readable storage medium having computer readable program code embodied therewith. The computer readable program code may include computer readable program code configured to determine dependencies between a plurality of data items for saving the data items. The computer readable program code may additionally include computer readable program code configured to initiate a save operation. The save operation may include forming a partial-order plan for saving the data items. Forming the partial-order plan may include creating an ordered list of steps which are executable for saving the data items based on the dependencies between the data items.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
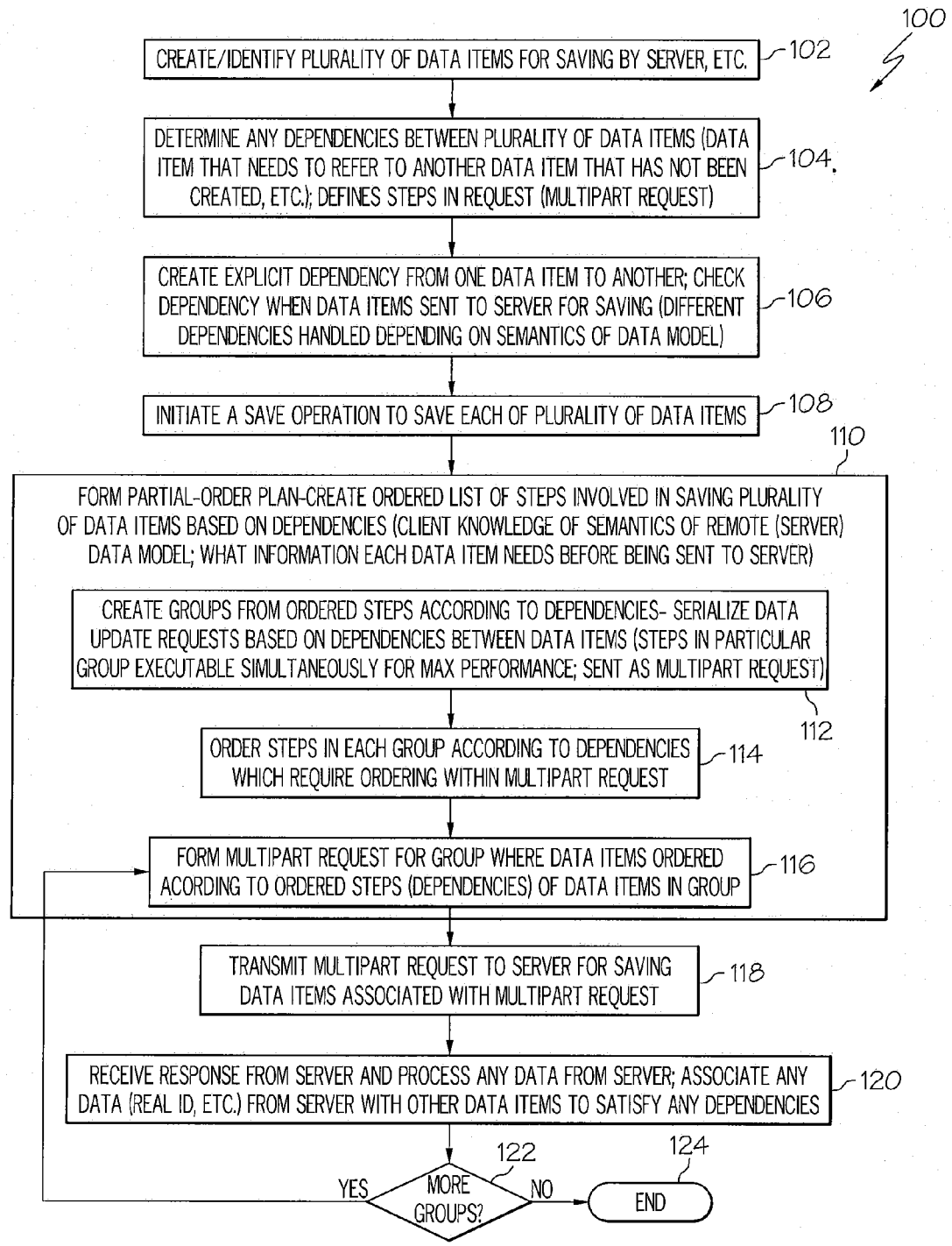
FIG. 1 is a flowchart of an example of a method for saving in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein saving data may include but is not necessarily limited to creating data, updating existing data, saving data residing on a server or on a storage device associated with a server via create, read, update, delete or destroy (CRUD) operations or similar operations.

FIG. 1 is a flowchart of an example of a method 100 for saving data in accordance with an embodiment of the present invention. In block 102, a plurality of data items may be created or identified on a client computer system or processing device for saving by a server or other processing device.

In block 104, any dependencies between the plurality of data items may be determined. A dependency between data items may be defined as one data item that needs to refer to another data item that has not been created or stored on a server. For example, a child data item may require a real ID or other information about a parent data item before the child data item can be sent to the server. Accordingly the parent data item must be stored or created on the server first. The server may then return a response to the client including an ID and/or other information about the parent data item so that the child data item may reference the real ID or information associated with the parent data item.

In block 106, an explicit dependency may be created from one data item to another data item. The dependency may then be checked when the data items are sent to the server for saving. Different dependencies may be handled differently depending on the semantics of the data model. The data model may require a data item that is created to include a reference to other data items that it directly depends on based on the semantics of the model. For example, in a data model that is represented as a tree of data items, children are dependent on their parents. In such a model, when a child is created it must include a reference to its parent so that the data model can insert it into the correct position in the tree. Further, a child data item may also need to specify who its next sibling data item is in the model. In this case, the child data item would need to include a reference to its next sibling data item as well so that the model can include that information when inserting the data item into the tree. Other semantics may apply that allow for arbitrary dependencies based on how the data model defines relationships between items, and these semantics enforce requirements on what information is required when a data item is read, created, updated, deleted or destroyed.

In block 108, a save operation may be initiated to save each of the plurality of data items. In block 110, a partial-order plan may be formed. Forming the partial-order plan may include creating an ordered list of steps involved in saving the plurality of data items based on the dependencies between the data items. In order to create the ordered list of steps for the partial-order plan, the client may acquire or may already have knowledge of the semantics of the remote server or data model and what information each data item may need before being sent to the server.

Block 110 may also include the operations or functions described with reference to blocks 112, 114 and 116 which may be performed as part of forming the partial-order plan. In block 112, groups of ordered steps may be created according to the dependencies between the data items. The steps for saving the data items associated with a particular group may be executable simultaneously for maximum performance. Data update requests may be serialized based on the dependencies between the data items.

In block 114, the steps in each group of steps may also be ordered according to any dependencies that may be required in a multipart request. In block 116, a multipart request including one group of steps or a first group of steps of the groups of ordered steps created in block 112 may be formed. The data items are ordered according to the ordered steps taking into account the dependencies of the data items associated with the group of steps.

In block 118 the multipart request may be transmitted to the server for saving the data items associated with the multipart request.

In block 120, a response may be received from the server and any data from the server may be processed. Processing data from the server may include associating data received from the server with a particular data item to satisfy any dependencies associated with the particular data item. For example, a real ID or other information associated with a parent data item which was stored by the server as part of a first or earlier multipart request may be included in the response from the server. The real ID or information associated with the parent data item may then be associated with a child data item or referenced by the child item to be saved as part of a subsequent multipart request.

In block 112, a determination may be made if there are more groups of ordered steps with associated data items that need to be saved. If there are more groups of ordered steps, the method 100 may return to block 116 and the method 100 may continue similar to that previously described. If there are no more groups of steps to be processed, the method 100 may end at determination 124.

Figure 2:
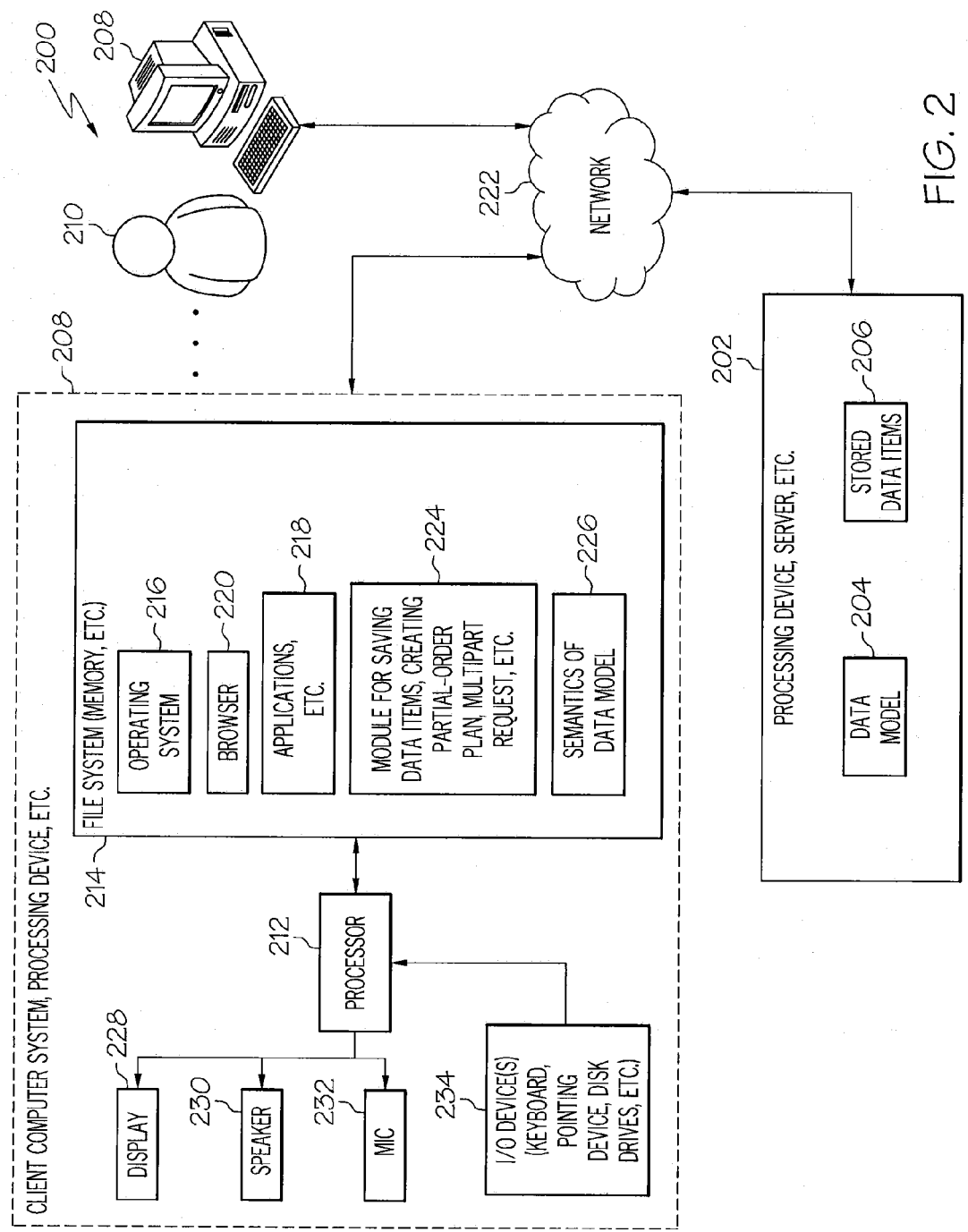
FIG. 2 is a block schematic diagram of an example of a system for saving data in accordance with an embodiment of the present invention.

FIG. 2 is a block schematic diagram of an example of a system 200 for saving data in accordance with an embodiment of the present invention. The method 100 of FIG. 1 may be embodied in or performed by the system 200. The system 200 may include a processing device 202. The processing device 202 may be a server or similar processing device. The processing device 202 or sever may include a data model 204 for storing data items 206 as described herein. In another aspect of the invention, a storage device may be associated with the processing device 202 for storing the data items similar to that described herein.

The system 200 may also include a client computer system 208 usable by an operator or user 210. The client computer system 208 may be any sort of computing device or processing device and may include a communications device such as a mobile or handheld computer or communications device. The method 100 may be embodied in and performed by the computer system 208 or processing device. The computer system 208 may include a processor 212 to control operation of the computer system 208 and a file system 214, memory or similar data storage device. An operating system 216, applications 218 and other programs may be stored on the file system 214 for running or operating on the processor 212. A web or Internet browser 220 may also be stored on the file system 214 for accessing the processing device 202 or server via a network 222 for saving data similar to that described herein. The network 222 may be the Internet, an intranet or other private or proprietary network.

A module 224 for saving data similar to that described herein may also be stored on the file system 214 and operable on the processor 212. The method 100 described with reference to FIG. 1 may be embodied in the module 224. Accordingly, the module 224 may be adapted to create a partial-order plan as described herein, generate multipart requests and perform other operations similar to those described herein and in reference to FIG. 1.

Semantics of a data model 226 may also be stored on the file system. As previously described, knowledge of the semantics of the remote data model and what information each data item needs may be used in forming the partial-order plan and creating the list of ordered steps involved saving the plurality of data items.

The computer system 208 may also include a display 228, a speaker system 230, and a microphone 232 for voice communications. The computer system 208 may also include one or more input devices, output devices or combination input/output devices, collectively I/O devices 234. The I/O devices 234 may include a keyboard or keypad, pointing device, such as a mouse, disk drives and any other devices to permit a user, such as user 210, to interface with and control operation of the computer system 208.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for saving data, comprising:
   determining dependencies, by a processing device, between a plurality of data items for saving the data items;
   initiating a save operation by the processing device, wherein initiating the save operation comprises forming a partial-order plan for saving the data items, and wherein forming the partial-order plan comprises creating an ordered list of steps which are executable for saving the data items based on the dependencies between the data items, wherein one data item is dependent on at least one other data item in response to the one data item needing to reference the at least one other data item that has not been created or stored and the partial-order plan saves the at least one other data item before the one data item is saved;
   referencing the at least one other data item by the one data item in response to saving the at least one other data item; and
   saving the one data item.

2. The method of claim 1, wherein forming the partial-order plan comprises forming at least one group of steps from the ordered list of steps according to the dependencies between the data items.

3. The method of claim 2, wherein the steps in each group of the at least one group of steps are executable simultaneously.

4. The method of claim 2, further comprising forming a multipart request comprising one group of steps of the at least one group of steps, wherein the steps in the one group of steps are executable simultaneously.

5. The method of claim 4, further comprising ordering the steps in the one group of steps according to dependencies which require ordering in the multipart request.

6. The method of claim 5, further comprising transmitting the multipart request to a server for saving the data items associated with the multipart request.

7. The method of claim 6, further comprising:
   receiving a response from the server in response to the server saving the data items associated with the multipart request; and
   processing any data received from the server.

8. The method of claim 7, further comprising:
   determining if there is another group of steps for saving other data items of the plurality of data items; and
   forming another multipart request in response to there being another group of steps.

9. The method of claim 7, wherein processing any data received from the server comprises associating any data received from the server with a particular data item to satisfy a dependency associated with the particular data item.

10. A system for saving data, comprising:
    a processing device; and
    a module operating on the processing device for saving data, wherein the module is adapted to determine dependencies between a plurality of data items and to initiate a save operation, a partial-order plan for saving the data items is formed in response to the save operation and an ordered list of steps is created, the ordered list of steps being executable for saving the data items based on the dependencies between the data items, wherein one data item is dependent on at least one other data item in response to the one data item needing to reference the at least one other data item that has not been created or saved and the partial-order plan saves the at least one other data item before the one data item is saved, the one data item makes reference to the at least one data item in response to the at least one other data item being saved and the one data item being saved after making reference to the at least one data item.

11. The system of claim 10, further comprising at least one group of steps from the ordered list of steps being formed according to the dependencies between the data items.

12. The system of claim 11, wherein a multipart request is formed comprising one group of steps of the at least one group of steps, wherein the steps in the one group of steps are executable simultaneously.

13. The system of claim 12, wherein the steps in the one group of steps are ordered according to dependencies which require ordering in the multipart request.

14. The system of claim 13, wherein the multipart request is transmitted to a server for saving the data items associated with the multipart request.

15. A computer program product for saving data, the computer program product comprising:
    a computer readable storage medium that is not a signal propagating medium having computer readable program code embodied therewith, the computer readable program code comprising:
    computer readable program code configured to determine dependencies between a plurality of data items for saving the data items;
    computer readable program code configured to initiate a save operation, wherein the save operation comprises forming a partial-order plan for saving the data items, and wherein forming the partial-order plan comprises creating an ordered list of steps which are executable for saving the data items based on the dependencies between the data items, wherein one data item is dependent on at least one other data item in response to the one data item needing to reference the at least one other data item that has not been created or stored and the partial-order plan saves the at least one other data item before the one data item is saved;
    computer readable program code configured to reference the at least one other data item by the one data item in response to saving the at least one other data item; and
    computer readable program code configured to save the one data item.

16. The computer program product of claim 15, wherein the computer readable program code further comprises computer readable program code configured to form at least one group of steps from the ordered list of steps according to the dependencies between the data items.

17. The computer program product of claim 16, wherein the computer readable program code further comprises computer readable program code configured to form a multipart request comprising one group of steps of the at least one group of steps, wherein the steps in the one group of steps are executable simultaneously.

18. The computer program product of claim 17, wherein the computer readable program code further comprises computer readable program code configured to order the steps in the one group of steps according to dependencies which require ordering in the multipart request.

19. The computer program product of claim 18, wherein the computer readable program code further comprises:
   computer readable program code configured to transmit the multipart request to a server for saving the data items associated with the multipart request;
   computer readable program code configured to receive a response from the server in response to the server saving the data items associated with the multipart request; and
   computer readable program code configured to process any data received from the server.

20. The computer program product of claim 19, wherein the computer readable program code further comprises:
   computer readable program code configured to determine if there is another group of steps for saving other data items of the plurality of data items; and
   computer readable program code configured to form another multipart request in response to there being another group of steps.

21. The method of claim 1, further comprising:
   forming a plurality of groups of steps from the ordered list of steps which are executable for saving the plurality of data items;
   forming a multipart request for each group of steps, the plurality of groups of steps forming each multipart request are in an order based on dependencies between the groups of steps for saving the plurality of data items;
   transmitting each multipart request to another processing device for saving the data items associated with each multipart request;
   receiving information from the other processing device in response to the other processing device saving the data items associated with each multipart request; and
   associating the information received from the other processing device for each multipart request with at least one other data item of the plurality of data items saved as part of a subsequent multipart request formed and transmitted to the other processing device.

22. The method of claim 21, wherein associating the information with the at least one other data item comprises referencing at least one saved data item by the at least one other data item saved as part of a subsequent multipart request transmitted to the other processing device.

* * * * *